US011621661B2

(12) United States Patent
Kulkarni et al.

(10) Patent No.: US 11,621,661 B2
(45) Date of Patent: Apr. 4, 2023

(54) MOTOR CONTROL WITH REDUCED BACK CURRENT DURING BRAKING

(71) Applicant: TEXAS INSTRUMENTS INCORPORATED, Dallas, TX (US)

(72) Inventors: Prasad Kulkarni, Bengaluru (IN); Venkata Pavan Mahankali, Bangalore (IN); Ganapathi Hegde, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/384,582

(22) Filed: Jul. 23, 2021

(65) Prior Publication Data

US 2023/0023055 A1 Jan. 26, 2023

(51) Int. Cl.
*H02P 21/10* (2016.01)
*H02P 21/22* (2016.01)
*H02P 21/18* (2016.01)

(52) U.S. Cl.
CPC .............. *H02P 21/10* (2013.01); *H02P 21/18* (2016.02); *H02P 21/22* (2016.02); *H02P 2207/055* (2013.01)

(58) Field of Classification Search
CPC .......... H02P 21/10; H02P 21/18; H02P 21/22; H02P 3/18; H02P 3/06; H02P 3/22; H02P 21/36
See application file for complete search history.

(56) References Cited

U.S. PATENT DOCUMENTS

2017/0353135 A1\* 12/2017 Dutta ................. H02P 9/08

FOREIGN PATENT DOCUMENTS

EP 3219579 A1 \* 9/2017 ............ B60L 11/126
JP 2007202295 A \* 8/2007

OTHER PUBLICATIONS

Texas Instruments, "Clarke & Parke Transforms on the TMW320C2xx," Lit. No. BPRA048 (1997), Texas Instruments Incorporated, 12500 TI Blvd., Dallas, Texas 75243 USA https://www.ti.com/lit/an/bpra048/bpra048.pdf.
Comparison of two position and speed estimation techniques used in PMSM sensorless vector control, 4th IET International Conference on Power Electronics, Machines and Drives (PEMD 2008), Apr. 2008, York, United Kingdom. pp. 626-630.
Texas Instruments, Clarke & Parke Transforms on the TMW320C2xx, Lit. No. BPRA048 (1997), Texas Instruments Incorporated, 12500 TI Blvd., Dallas, Texas 75243 USA.

\* cited by examiner

*Primary Examiner* — Bickey Dhakal
(74) *Attorney, Agent, or Firm* — Valerie M. Davis; Frank D. Cimino

(57) ABSTRACT

Described examples include a method that includes setting a reference $i_q$ signal in a field-oriented control of a motor such that the field-oriented control modulates power from a power supply using a modulator to apply a torque on the motor that is opposite to a kinetic energy applied to the motor. The method also includes setting a reference $i_d$ signal in the field-oriented control such that the motor current provided to the power supply is reduced.

17 Claims, 11 Drawing Sheets

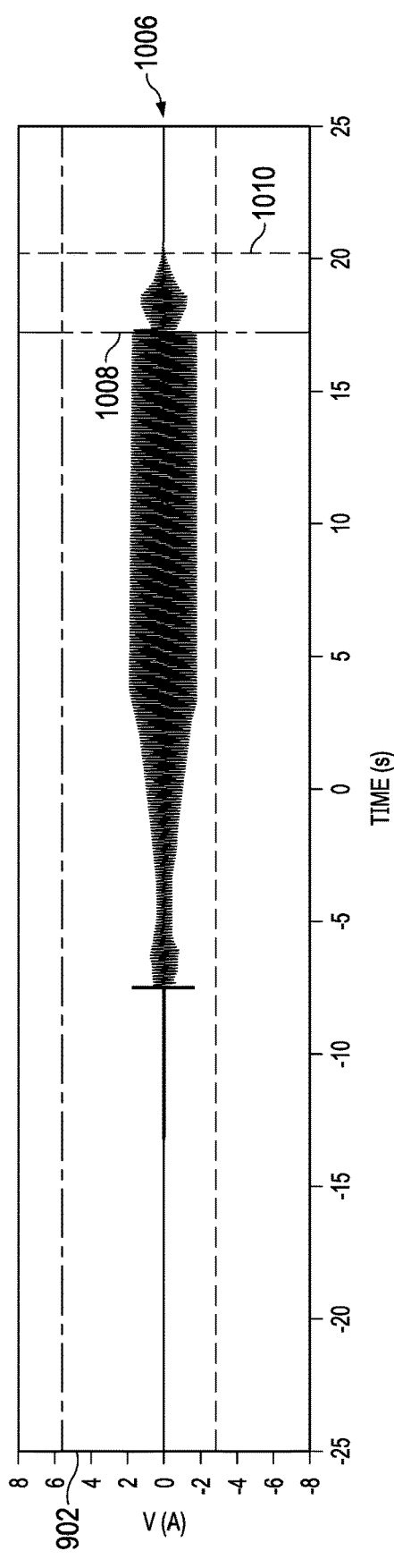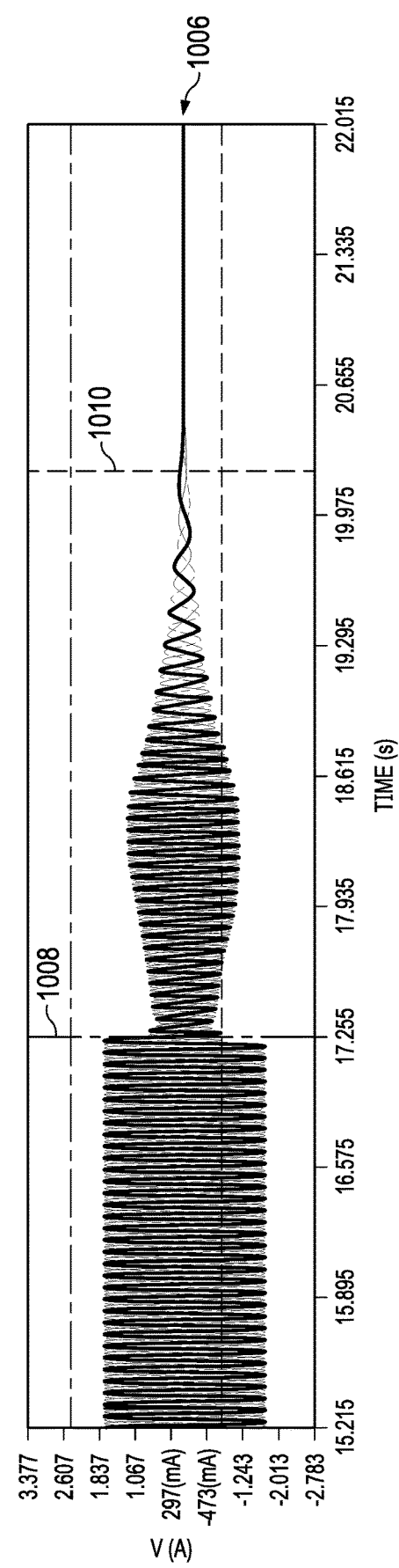
FIG. 10

MOTOR CONTROL WITH REDUCED BACK CURRENT DURING BRAKING

TECHNICAL FIELD

This relates generally to electric motor control, and in particular examples to a motor control with reduced back current during braking.

BACKGROUND

Electric motors can have a number of configurations. However, a basic configuration for most motors is a rotational model with a stator and a rotor. As implied by their name, stators are stationary and rotors rotate. Rotational energy is generated by opposing magnetic forces between the rotor and the stator. For example, electricity may be applied to a winding in the stator that generates a magnetic field. When the north part of that magnetic field is near a north pole of a magnet in the rotor, repulsive magnetic forces cause the rotor to rotate. By changing the current applied to windings in one or both of the stator and rotor, the motor can provide continuous rotation.

A major difference in types of electric motors is between brushed and brushless. If electric energy is applied to windings in the rotor, a mechanism is included to get the electricity to those windings while the rotor is rotating. This mechanism usually includes contacts called brushes that contact electrodes on the rotor. Brushes are usually blocks of carbon that contact the electrodes, but they are called brushes for historical reasons. As the rotor rotates, different electrodes come in contact with different brushes to generate the opposing magnetic forces needed to produce torque in the motor. However, as the brush and electrode system is subject to wear and mechanical failure, brushless motors have become a more popular configuration.

Brushless motors do not have any electrical contact to the rotor. The rotor includes either permanent magnets or coils in which magnetic fields are induced by the magnetic fields of the stator. The use of permanent magnet rotors is more common. Torque is generated by varying the current applied to coils in the stator. This is usually done electronically and thus the timing and intensity of the fields generated in the stator can be well controlled. Because there is no brush/electrode system to mechanically fail and because the electronic systems used to drive brushless motors can provide more sophisticated control over motor operations, brushless motors are becoming more prevalent.

Brushless motors are used in a wide variety of applications. For example, they may be used to drive fans, such a ceiling fans, water pumps, vehicles, and industrial machines. In some circumstances, a motor may be spinning in the opposite of a desired direction or must be stopped. In these circumstances, the motor will have rotational kinetic energy that must be dissipated. For example, if wind causes a ceiling fan to spin in the opposite of the desired direction for the fan to spin, the energy caused by the fan spinning in the opposite direction must be dissipated and energy must be supplied to the fan to cause the fan to spin in the desired direction.

Braking or reversing an electric motor involves absorbing/dissipating kinetic energy from the rotating motor. In the above example, if the wind is blowing a ceiling fan in one direction of rotation and it is desired to run the fan in the opposite direction of that rotation, the kinetic energy of the moving fan must be absorbed/dissipated somewhere. In simple fan controls, a reverse current is applied to the motor of the ceiling fan to apply torque in the opposite direction that the fan is currently rotating.

In more sophisticated motor control systems, such as field-oriented control (FOC), the timing of pulses applied to the stator (stationary) coils is altered to induce the desired rotation and speed. Control systems such as FOC operate on brushless motors. As discussed above, when braking or reversing permanent magnet type motors, the action of braking or reversing cause back current to be supplied back to the power source. If the power source is something that can absorb this energy, like a battery, this is not a problem. However, for example, if the power source is a dc-to-dc converter or ac-to-dc converter, this reverse current may be enough to damage the power supply and/or its related circuitry.

SUMMARY

In accordance with an example, a method includes setting a reference torque factor ($i_q$) signal in a field-oriented control of a motor such that the field-oriented control modulates power from a power supply using a modulator to apply a torque to the motor that is opposite to a kinetic energy applied to the motor. The method also includes setting a reference magnetizing flux factor ($i_d$) signal in the field-oriented control such that the motor current provided to the power supply is reduced.

In accordance with another example, a motor control includes a field-oriented control having a reference iq input, a reference id input and coil current feedback inputs configured to receive current signals from at least two current sensors detecting current through at least two coils in a motor, the field-oriented control configured to provide control signals to a modulator that modulates power from a power supply applied to the at least two coils; and includes a reference id controller having a reference idc input configured to receive a reference idc signal, an idc input configured to receive a supply current measure, and a reference id output coupled to the reference id input configured to provide a reference id signal, wherein the reference id controller is configured to increase the reference id signal in proportion to a difference between the reference idc input and the supply current measure when the idc input indicates that power is flowing from the motor to the power supply.

In another example, a motor control system adapted to be coupled to a power supply and a motor having a stator with at least two coils, the motor control system includes a modulator coupled to the power supply, wherein the modulator controls application of power from the power supply to the at least two coils. The motor control system also includes a field-oriented control having a reference iq input, a reference id input and coil current feedback inputs configured to receive current signals from at least two current sensors detecting current through the at least two coils, the field-oriented control configured to provide control signals to the modulator; and a reference id controller having a reference idc input configured to receive a reference idc signal, an idc input configured to receive measured supply current provided by a current sensor on the power supply, and a reference id output coupled to the reference id input configured to provide a reference id signal, wherein the reference id controller is configured to increase the reference id signal in proportion to a difference between the reference idc input and the measured supply current when the idc input indicates that power is flowing from the motor to the power supply.

In another example, a method includes setting a reference iq signal in a field-oriented control of a motor such that the field-oriented control modulates power from a power supply using a modulator to apply a torque on the motor that is opposite to a kinetic energy applied to the motor; and setting a reference id signal in the field-oriented control such that the motor current provided to the power supply is reduced.

BRIEF DESCRIPTION OF THE DRAWINGS

FIG. 10 is a graph showing the slowing of the example motor arrangement of FIG. 8 using active braking by applying a negative $i_q$ along with an offsetting $i_d$.

DETAILED DESCRIPTION

Figure 1:
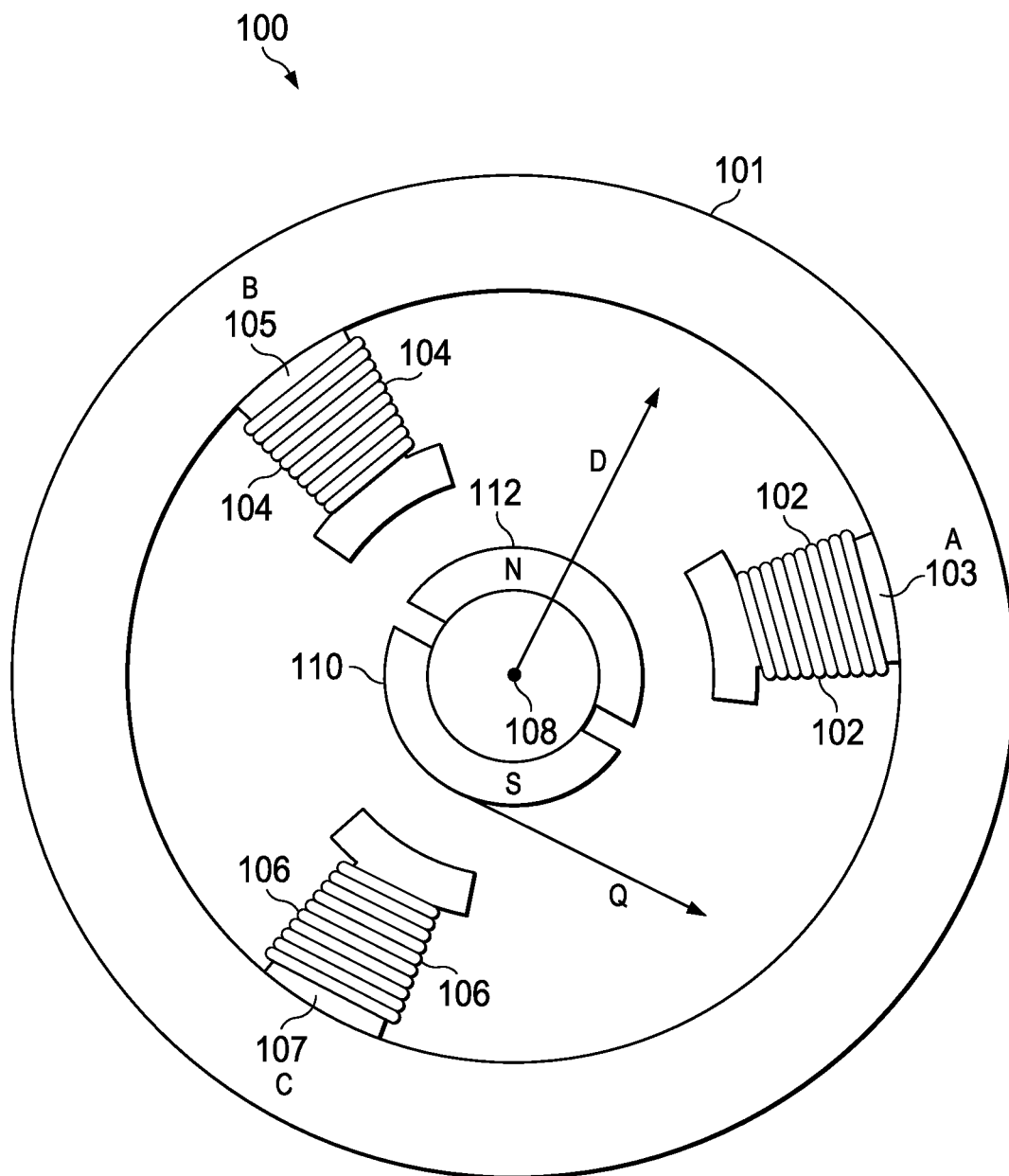
FIG. 1 is a block diagram illustrating concepts of field-oriented control (FOC).

In the drawings, the same reference numbers and other reference designators are used to illustrate the same or similar (functionally and/or structurally) features. The drawings are not necessarily drawn to scale.

FIG. 1 is a schematic diagram illustrating concepts of field-oriented control (FOC). Motor 100 includes a stator 101 with three stationary windings: winding 102, winding 104 and winding 106. Each winding surrounds a metal core: core 103, core 105 and core 107, respectively. The combined winding and core comprise electro-magnets A, B, and C, respectively. In this example, winding 102, winding 104 and winding 106 are positioned about the rotational axis 108 and spaced 120 degrees apart from each other. That is, winding 104 is 120 degrees from winding 102, winding 106 is 120 degrees from winding 104, and winding 102 is 120 degrees from winding 106. In other example embodiments, additional stators/windings are included in motor 100. In these example embodiments, the angular positioning depends on the number of stators/windings included in the motor. The stator 101 is stationary relative to the rotor 110, which rotates about the rotational axis 108. In this example, rotor 110 includes a permanent magnet 112 with the north pole of permanent magnet 112 labeled N and the south pole of permanent magnet 112 labeled S. In other examples, rotor 110 includes two or more permanent magnets.

Current is applied to winding 102, winding 104 and winding 106. By timing the pulses of current applied to winding 102, winding 104 and winding 106, a force is applied to rotate rotor 110. For example, in the position shown in FIG. 1, a current is applied to winding 102 causing a magnetic field through core A having a north pole directed at rotor 110. Thus, the north pole of applied magnetic field from winding 102 is opposed to the north pole of permanent magnet 112. This causes a force that causes rotor 110 to rotate counterclockwise. As the north pole of permanent magnet 112 rotates away from winding 102, the north pole of winding 102 provides an attractive force to the south pole of permanent magnet 112. However, after passing the center of the south pole of permanent magnet 112 rotates past winding 102, the attractive force to winding 102 would pull in the opposite direction of rotation. This is avoided by stopping or reversing the current in winding 102. In some examples, the current in winding 102 is reversed rather than stopped so that the south pole of the magnetic field produced by the reversed current through winding 102 further rotates rotor 110. The timing and duration of current pulses in winding 102, winding 104, and winding 106 causes a selected rotational force on rotor 110. When the motor 100 is energized and rotor 110 is moving, winding 102, winding 104, and winding 106 apply a rotational force Q to rotor 110 and a force, D, orthogonal to Q. In practice, the D force is manifested as heat in motor 100, and thus the D force is minimized to minimize wasted energy not used to rotate the rotor. As further explained hereinbelow, Q and D are the sum of the forces in the reference frame of the rotor as provided by the stator electro-magnets A, B, and C as transformed using the Clarke and Park transforms (further discussed hereinbelow) to transform these forces first from three vectors to two (α and β) in the stator reference frame (Clarke transform), and then to vectors D and Q in the rotor reference frame (Park transform).

Figure 2:
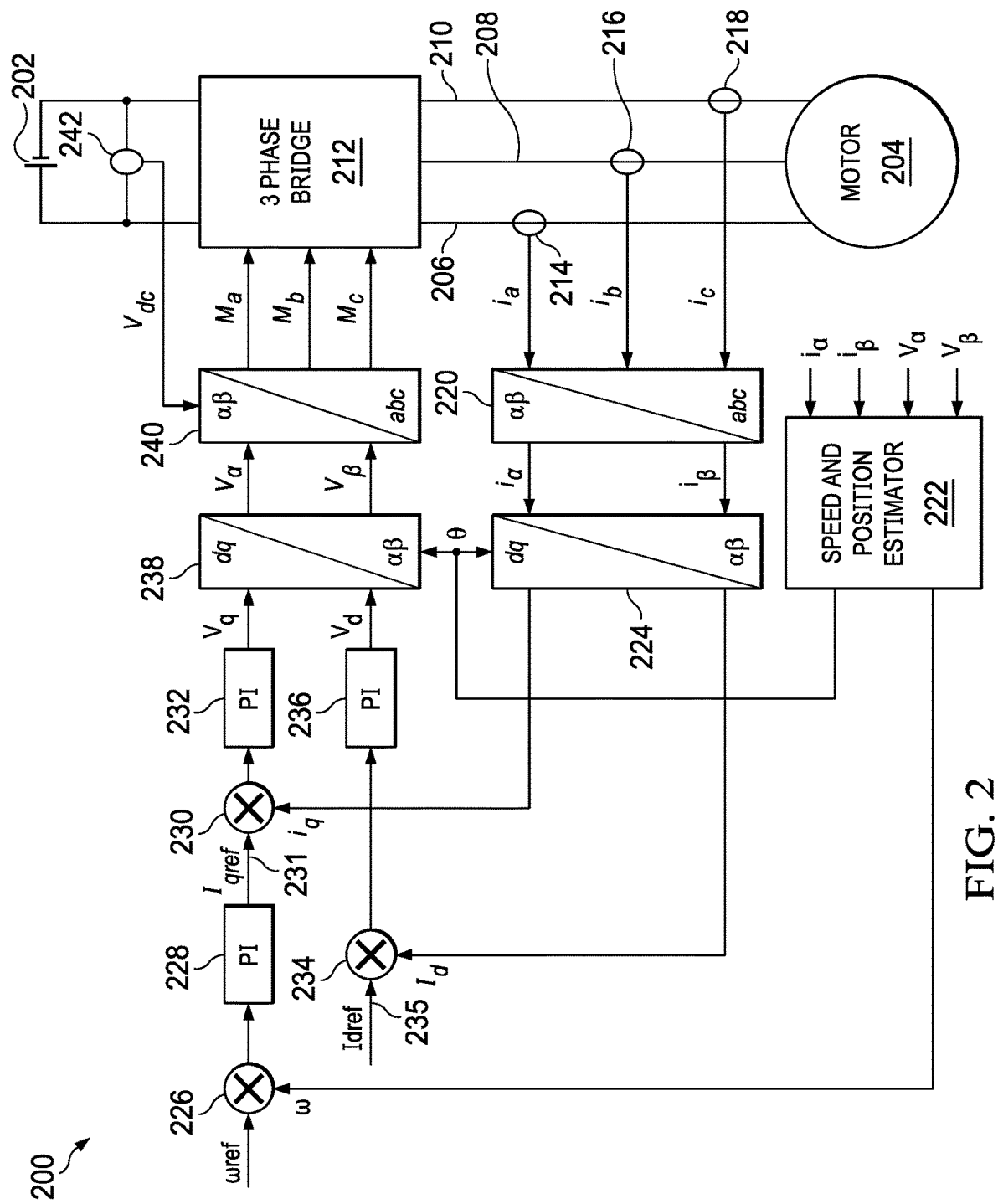
FIG. 2 is a block diagram of an example FOC driving circuit.

FIG. 2 is schematic diagram of an example FOC driving circuit 200. In FOC driving circuit 200, power source 202 provides power to rotate motor 204. Power source 202 is a dc-to-dc power converter in this example. In other examples, power source 202 is a battery, an ac-to-dc converter or another power source. Motor 204 includes three stator windings in this example, such as winding 102 (FIG. 1), winding 104 (FIG. 1) and winding 106 (FIG. 1). First driving line 206 is a conductor pair that drives the first stator of motor 204. In this example, first driving line 206 is labeled line "a". Second driving line 208 is another conductor pair that drives a second stator of motor 204. In this example, driving line is labeled line "b". Third driving line 210 is another conductor pair that drives the third stator of motor 204. In this example, third driving line 210 is labeled line "c". Motor 204 is driven by power source 202 through a modulator such as three-phase bridge 212, through first driving line 206, second driving line 208 and third driving line 210. Three-phase bridge 212 is under the control of signals $m_a$, $m_b$ and $m_c$.

In this example, the current through three coils (e.g. windings 102, 104 and 106) is detected by first current sensor 214, second current sensor 216 and third current sensor 218. Current detectors 214, 216 and 218 detect current signals $i_a$, $i_b$, and $i_c$, respectively, which are the coil current feedback signals representing the current through three stator coils, examples of which are winding 102 (FIG. 1), winding 104 (FIG. 1) and winding 106 (FIG. 1) in this example. In other examples, two current sensors are used to detect current through two of the three stator coils. Of note, in this example, except for the coupling from the power source 202 to each of the three-phase bridge 212, first driving line 206, second driving line 208, and third driving line 210, each of the signals in FOC driving circuit 200 are digital signals representing numerical values. These digital signals may be transmitted in parallel, serially, or in a number of manners used for transmitting digital signals.

Circuit 220 performs a Clarke transform (e.g. converts the time-domain components of a three-phase motor, such as currents $i_a$, $i_b$, and $i_c$ into current values in a two-phase orthogonal stator frame, e.g. a fixed coordinate stator phase) and can be implemented using a processor, digital circuitry, a state machine, or other circuitry. Currents $i_a$, $i_b$ and $i_c$ are indicative of the forces in the motor in three phases. Circuit 220 converts these current values to current values, $i_\alpha$ and $i_\beta$ (e.g. equivalent signals in a stationary reference frame). Mathematically, this conversion follows Equations 1 and 2.

$$i_\alpha = \frac{2}{3}i_a - \frac{1}{3}(i_b + i_c) \quad (1)$$

$$i_\beta = \frac{1}{\sqrt{3}}(i_b - i_c) \quad (2)$$

These values represent stator currents converted from a three-phase system to a stationary two-phase system. Thus, to convert these values to values that represent the force on the rotor ($i_q$ and $i_d$) in the rotor reference frame, the angular position θ of the rotating plane of the rotor is required. Speed and position estimator circuitry 222 uses $i_\alpha$, $i_\beta$, $v_\alpha$, and $v_\beta$ to determine angular position signal θ and rotational speed ω. For examples of speed and positional estimation see Driss Yousfi, Abdallah Darkawi, "Comparison of two position and speed estimation techniques used in PMSM sensorless vector control," 4th IET International Conference on Power Electronics, Machines and Drives (PEMD 2008), April 2008, York, United Kingdom. pp. 626-630, which is hereby incorporated herein by reference. The determination of $v_\alpha$, and $v_\beta$ is discussed hereinbelow.

One of the outputs of speed and position estimator circuitry 222 is the estimated angular position θ of the rotor. Park transform circuitry 224 (implemented using, for example, a processor, state machine, digital circuitry and/or other circuitry) determines the $i_q$ signal ($i_q$) and $i_d$ signal ($i_d$) from $i_\alpha$, $i_\beta$ and θ using Equations 3 and 4.

$$i_d = i_\beta \cos θ - i_\alpha \sin θ \quad (3)$$

$$i_q = i_\beta \sin θ + i_\alpha \cos θ \quad (4)$$

FOC driving circuit 200 receives a reference rotational speed $ω_{ref}$ selected by a user or other speed selection circuitry (not shown), which is a desired or selected speed. The reference rotational speed $ω_{ref}$ is summed by first combiner 226 with the negative of the estimated speed co provided by the speed and position estimator circuitry 222 to determine a difference between the desired speed of rotation of the motor 204 and an estimate of the actual speed. First proportional integrator 228 integrates the output of first combiner 226 and proportionally adjusts the magnitude of the integrated output to provide a reference $i_q$ signal ($i_{qref}$) (i.e. multiplies the output of the integration by a fixed amount so that the output matches the range needed for this variable), which represents a change in the torque current $i_q$ to achieve the desired speed. Second combiner 230 receives $i_{qref}$ on a reference $i_q$ input 231 and sums $i_{qref}$ with the negative of $i_q$ provided by Park transform circuitry 224 to provide a combined $i_q$ signal. Second proportional integrator 232 integrates the output of second combiner 230 and adjusts the proportion to provide a $v_q$ signal that represents a voltage necessary to provide an adjusted torque necessary for the motor to reach the desired speed.

FOC driving circuit 200 receives on a reference $i_d$ input 235 a selected reference $i_d$ signal ($i_{dref}$) for the d dimension, which is orthogonal to the q dimension, that is the portion of the applied forces that does not produce torque in the motor. In some motors, this value would be zero or less than zero due to the configuration of the motor. This is ideal because all of the current ($i_q$) applied to the motor produces torque. In other motors, $i_d$ must be greater than zero for proper operation of the motor. The proper level of $i_d$ depends on the motor configuration and what is the most efficient combination of $i_d$ and $i_q$ for that configuration of motor. Third combiner 234 combines $i_{dref}$ with the negative of $i_d$ to provide a combined $i_d$ signal. Third proportional integrator 236 integrates the output of third combiner 234 and adjusts the proportion to provide a $v_d$ signal that represents an adjusted level in the d dimension for efficient operation of the motor.

Inverse Park transform circuitry 238 (implemented using, for example, a processor, state machine, digital circuitry and/or other circuitry) receives $v_q$, $v_d$, and θ, and provides a $v_\alpha$ signal and a $v_\beta$ signal according to Equations 5 and 6.

$$v_\alpha = v_d \cos θ - v_q \sin θ \quad (5)$$

$$v_\beta = v_d \sin θ + v_q \cos θ \quad (6)$$

These signals represent the voltages to be applied by the electro-magnets A, B, and C in the two vector (α and β) stator frame of reference. Inverse Clarke transform circuitry 240 (implemented using, for example, a processor, state machine, digital circuitry and/or other circuitry) receives $v_\alpha$, $v_\beta$, and a measured voltage or measured voltage supply signal ($V_{dc}$) provided by voltage sensor 242 (which measures the voltage of power source 202), and provides modulation signals ($m_a$, $m_b$, and $m_c$) according to Equations 7-9.

$$m_a = m(v_\alpha) \quad (7)$$

$$m_b = m\left(-\frac{1}{2}v_\alpha + \frac{\sqrt{3}}{2}v_\beta\right) \quad (8)$$

$$m_c = m\left(-\frac{1}{2}v_\alpha - \frac{\sqrt{3}}{2}v_\beta\right) \quad (9)$$

Where in is a function of $V_{dc}$ and converts the parenthetical values of Equations (7), (8), and (9) to time values for the pulse widths applied by three-phase bridge 212 through first driving line 206, second driving line 208 and third driving line 210 to drive motor 204. Thus, three-phase bridge 212 serves to modulate the application of power to the motor thereby changing the speed and direction of rotor 110. (See Texas Instruments, "Clarke & Parke Transforms on the TMW320C2xx," Lit. No. BPRA048 (1997), https://www.ti.com/lit/an/bpra048/bpra0.48.pdf, which is incorporated herein by reference in its entirety.)

The braking or reversing of motor 204 in the example of FIG. 2 can cause problems. As discussed above, braking or reversing a motor like motor 204 with permanent magnets provides back-current back to the power source 202 through three-phase bridge 212. If power source 202 is something that can absorb this energy, like a battery, this is not a problem. However, for example, if power source 202 is a dc-to-dc converter or ac-to-dc converter, this reverse current may be enough to damage power source 202 and/or its related circuitry.

Figure 3:
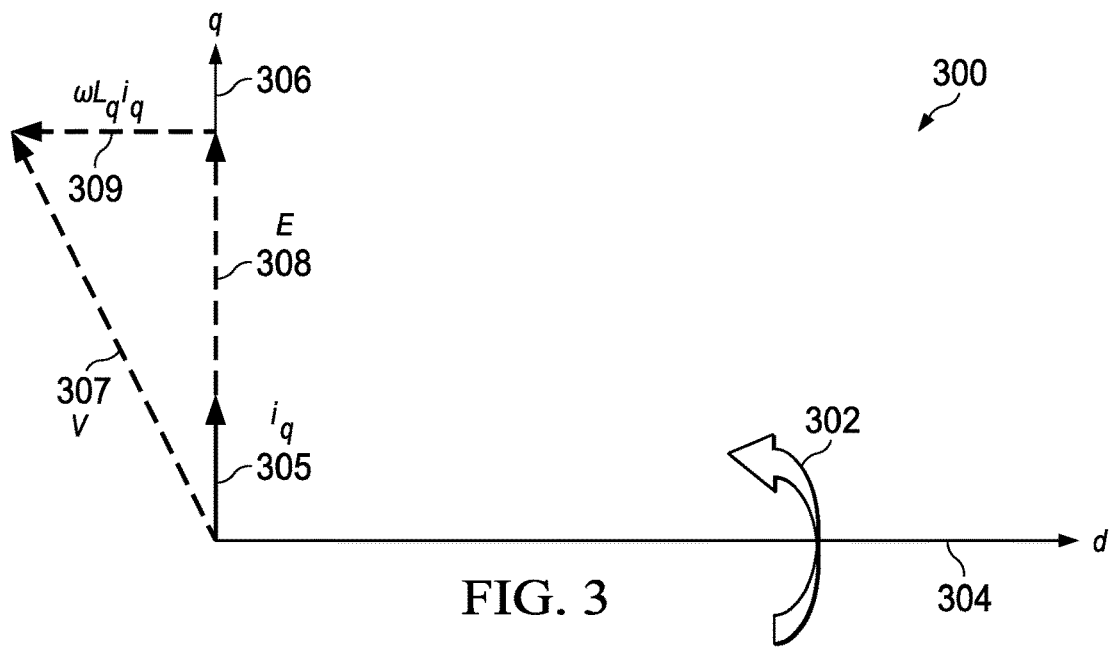
FIG. 3 is a graph of the operation of an example FOC system.

FIG. 3 is a graph 300 of the energy that is applied and used in the operation of an example FOC system. In graph 300, a motor, such as motor 204 (FIG. 2), is turning in the counterclockwise or anti-clockwise direction as shown by arrow 302. Axis 304 is the d-axis and axis 306 is the q-axis. Thus, graph 300 is a graph of the dq quadrature system. Vector 307 (V) is the voltage applied to the motor. The current in the q phase is $i_q$ shown as vector 305. Vector 309 is the back EMF (BEMF), which is the rotational speed ω multiplied by the motor inductance in the q phase, $L_q$, and $i_q$. The vector E (shown as vector 308) is the BEMF produced due to the permanent magnet of the rotor in this example. Vector 308 forms one leg of a right triangle, where the second leg has a value of $\omega L_q i_q$ and the hypotenuse has a value of V. Based on graph 300, the current, $i_q$, is in phase with the BEMF to maintain the rotation of the rotor.

Figure 4:
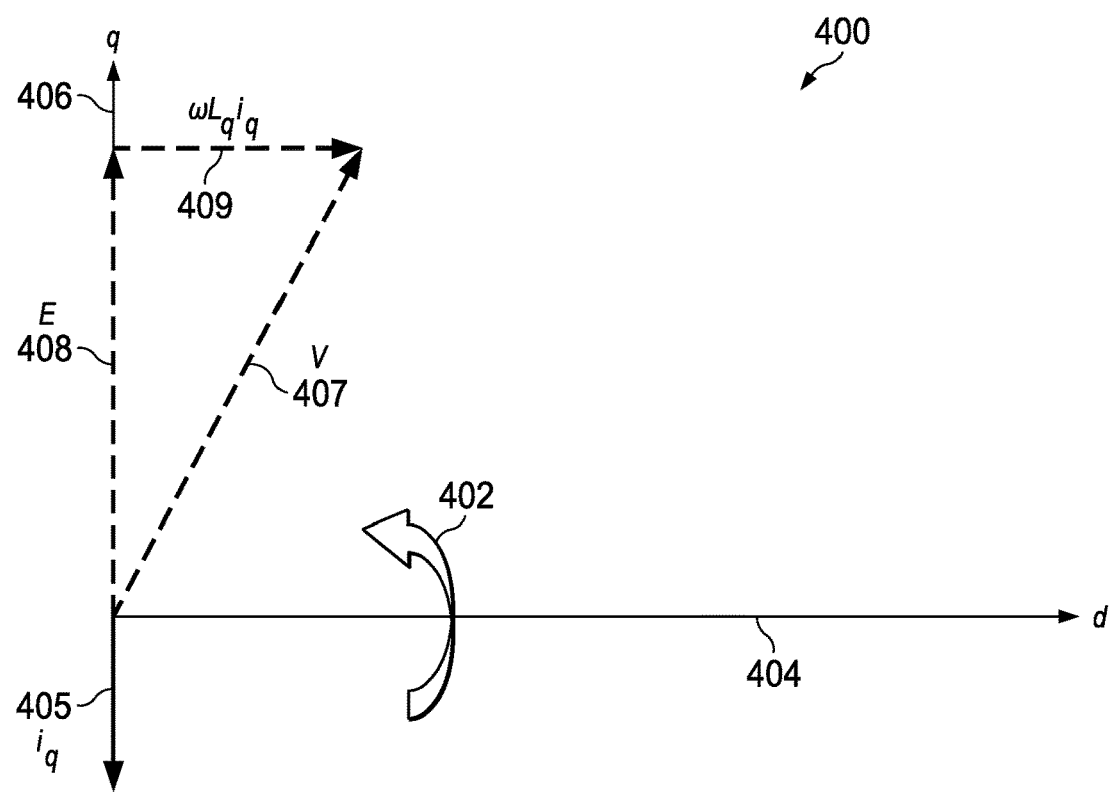
FIG. 4 is a graph of the operation of an example FOC system during braking.

FIG. 4 is a graph 400 of the operation of an example FOC system during braking (e.g. the drive current, $i_q$, is shown in the opposite direction as the BEMF). The d axis 404 is the d dimension of the q/d reference frame. The q axis 406 is the q dimension in the q/d reference frame. In this example, arrow 402 illustrates that the rotor is moving in the counterclockwise rotation. This rotation is not being driven by the motor. This rotation is a result of a prior operation of the motor (e.g. when a fan continues to spin after it is driven) or an outside force, such as wind spinning a ceiling fan. To brake the motor (e.g. to stop the fan from spinning), a signal $i_q$ is applied to provide a force in the opposite direction of rotation as shown as vector 405. The applied voltage V, shown as vector 407, forms the hypotenuse of a triangle with vector 408 (E) on the q axis and vector 409 ($\omega L_q i_q$) in the opposite direction of that of FIG. 3 because $i_q$ has the opposite polarity. A negative $i_q$ indicates that braking action is occurring. If the power supply can absorb the kinetic energy if the motor turning in the opposite of the desired direction of rotation that is converted to reverse current by the motor during braking, that is not a problem. However, with many power supplies, such as a dc-to-dc converter, this energy may cause a voltage spike that can damage circuits within the power supply or other circuits.

Figure 5:
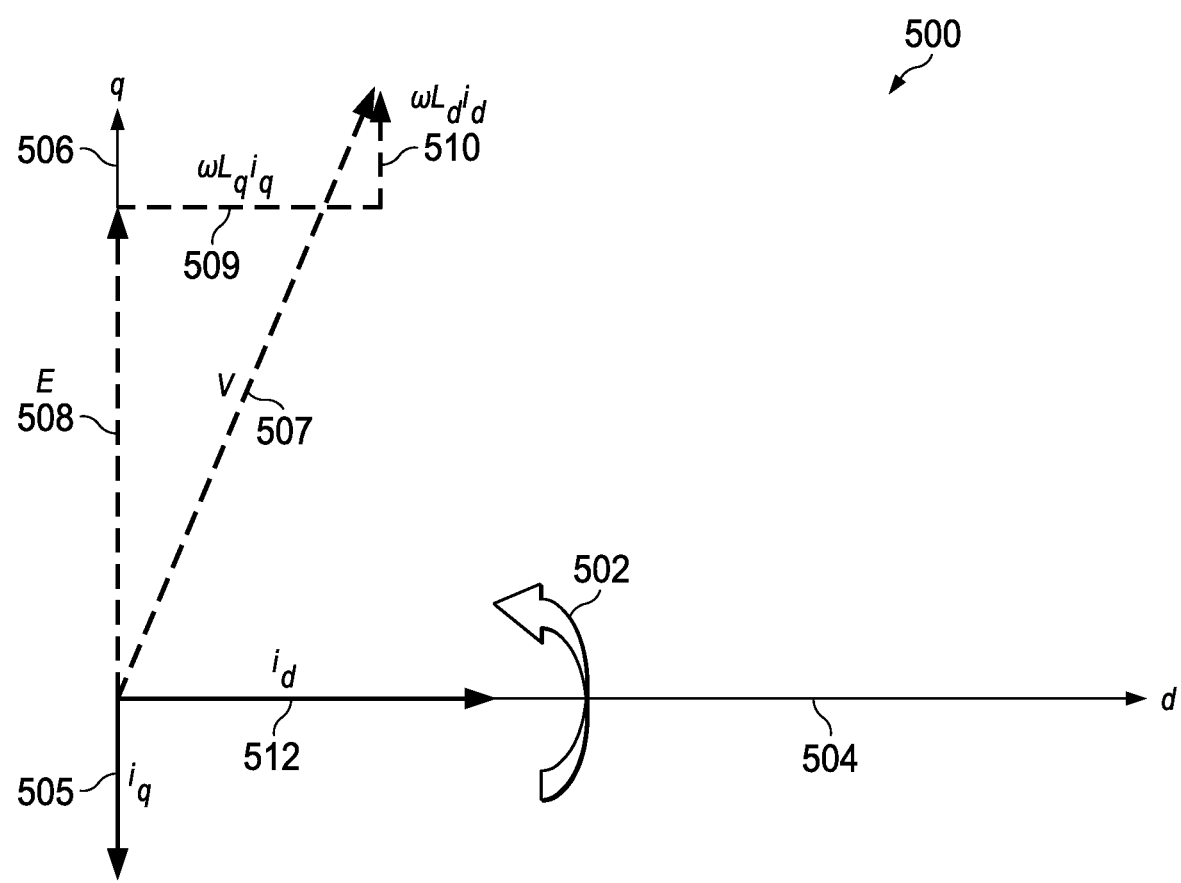
FIG. 5 is a graph of the operation of another example FOC system during braking.

FIG. 5 is a graph 500 of the operation of another example FOC system during braking. The d axis 504 is the d dimension of the q/d reference frame. The q axis 506 is the q dimension in the q/d reference frame. In this example, arrow 502 shows counterclockwise rotation of rotor 110. However, as with the example of FIG. 4, the rotation is from prior operation of the motor or an outside force, such as wind spinning a ceiling fan. To brake the motor, a signal $i_q$, shown as vector 505, is applied by the motor controller (e.g. FOC driving circuit 200 (FIG. 2)) in response to a user input to provide a force in the opposite direction of rotation. Unlike the example of FIG. 4, an additional signal $i_d$, shown as vector 512, is applied by the motor controller (which is further explained hereinbelow) as is shown along the d axis. The signal $i_d$ adds an additional vector 510 of $\omega L_d i_d$ between the vector 509 ($\omega L_q i_q$) and vector 507 (V) that is perpendicular to q axis 506 because the power consumption represented by vector 510 ($\omega L_d i_d$) is orthogonal to the consumption represented by vector 509 ($\omega L_q i_q$). Thus, vector 508 (E) is smaller relative to vector 408 (FIG. 4). In addition, vector 512 ($i_d$) is along the positive d axis, which represents a positive current applied to the motor but does not represent additional torque applied to the motor. Signal $i_q$, on the other hand, is along the negative q axis, which represents negative current applied to the motor and represents negative torque applied to the motor. By selecting an $i_d$ that offsets $i_q$, the net current applied to the power source from the BEMF can be reduced to near zero while the necessary braking torque is applied to the motor. This avoids a current spike to the power supply that can damage some power supplies. Increasing $i_d$ temporarily lowers the efficiency of the motor, thus the kinetic energy of the motor is dissipated as heat in the motor rather than a reverse current to the power supply. When $i_d$ is near zero during braking, the power to/from the battery is shown in Equation 10.

$$P_O = E * i_q \qquad (10)$$

Because $i_q$ is negative, power is provided to the power supply. In terms of the FOC inputs, the power input to the motor is Equation 11.

$$P_{in} = v_d i_d + v_q i_q \qquad (11)$$

To make $P_{in}$ approximately equal to zero, $v_d i_d$ is set at approximately $v_q(-i_q)$. Setting $P_{in}$ to approximately zero is ideal because it means that power is not being supplied to the power supply. However, in practical examples, $P_{in}$ is set to a positive value (the power supply is providing power) so that any disturbances due to the control loop or any other practical limitations will be absorbed by the buffer of extra power being drawn from source.

Figure 6:
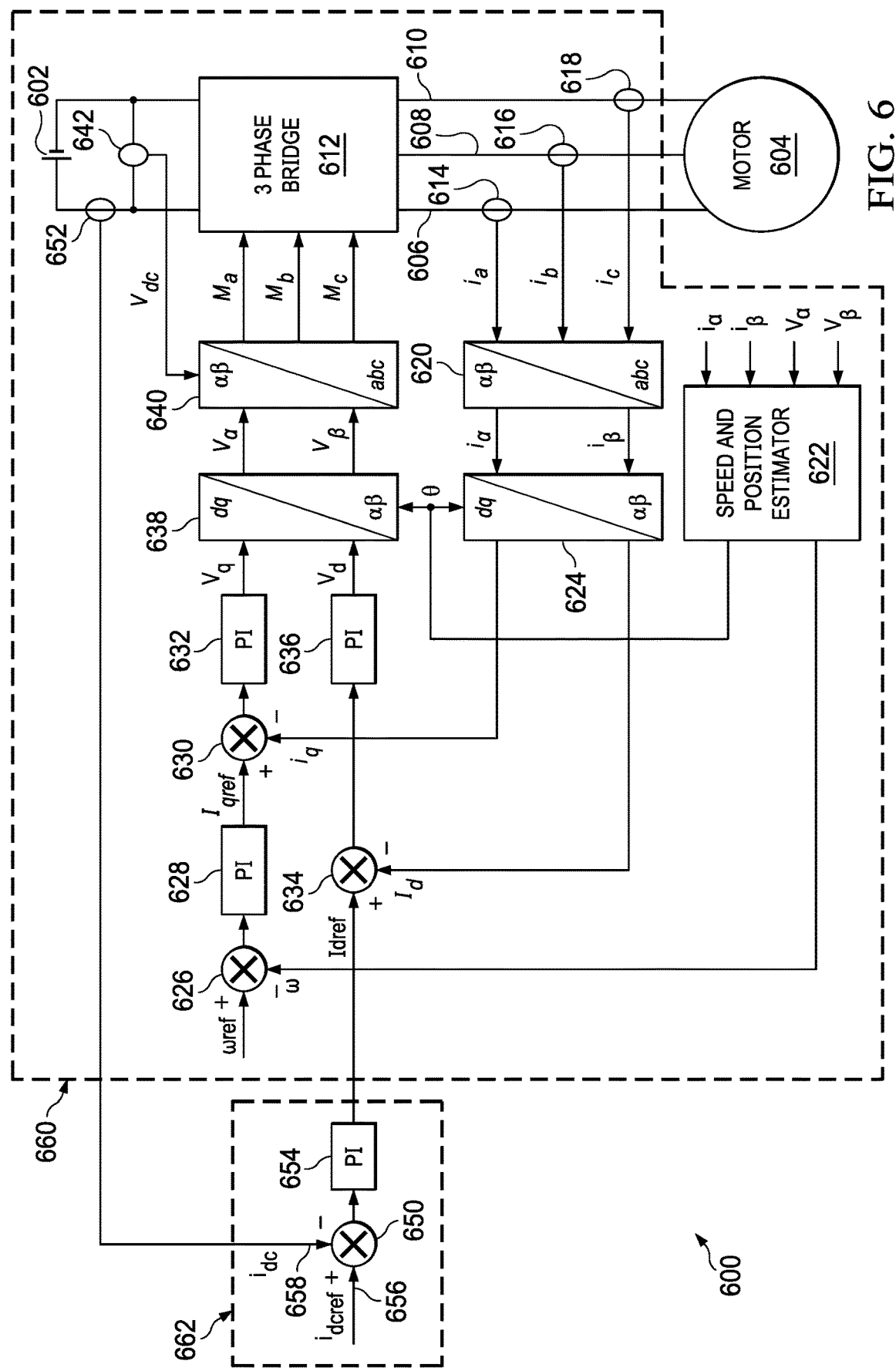
FIG. 6 is a schematic diagram of an example FOC system.

FIG. 6 is a schematic diagram of an example FOC system 600. In this example, FOC system 600 includes FOC controller 660 (controlling three-phase bridge 612) and reference $i_d$ controller 662. In some example embodiments, FOC controller 660 and reference $i_d$ controller 662 are formed on a single semiconductor substrate and in other example embodiments they are formed on different semiconductor substrates. In other embodiments, controller 660, controller 662 and/or three-phase bridge 612 are formed in the same semiconductor package and/or on the same semiconductor substrate. In other examples, FOC controller 660 and/or reference $i_d$ controller 662 are implemented using one or more general purpose processor(s), state machines, digital circuitry, look-up tables, and/or software elements or hardware/software implementations of the foregoing. Power source 602 is an example of power source 202 (FIG. 2). Power source 602 may include an alternating current (AC) or a direct current (DC) power source with or without power conversion circuitry. Motor 604 is an example of motor 204 (FIG. 2). In some example embodiments, motor 604 is a three-phase motor. In some example embodiments, motor 604 is a DC motor (e.g. a brushed or brushless motor) or an AC motor (e.g. an induction motor). Three-phase bridge 612 is an example of three-phase bridge 212 (FIG. 2). First driving line 606 is an example of first driving line 206 (FIG. 2). Second driving line 608 is an example of second driving line 208 (FIG. 2). Third driving line 610 is an example of third driving line 210 (FIG. 2). First current sensor 614 is an example of first current sensor 214 (FIG. 2). Second current sensor 616 is an example of second current sensor 216 (FIG. 2). Third current sensor 618 is an example of third current sensor 218 (FIG. 2). Circuit 620 is an example of circuit 220 (FIG. 2). Speed and position estimator 622 is an example of speed and position estimator circuitry 222 (FIG. 2). Park transform circuitry 624 is an example of Park transform circuitry 224 (FIG. 2). First combiner 626 is an example of first combiner 226 (FIG. 2). First proportional integrator 628 is an example of first proportional integrator 228 (FIG. 2). Second combiner 630 is an example of second combiner 230 (FIG. 2). Second proportional integrator 632 is an example of second proportional integrator 232 (FIG. 2). Third combiner 634 is an example of third combiner 234 (FIG. 2). Third proportional integrator 636 is an example of third proportional integrator 236 (FIG. 2). Inverse Park transform circuit 638 is an example of inverse Park transform circuitry 238 (FIG. 2). Inverse Clarke transform circuitry 640 is an example of inverse Clarke transform circuitry 240 (FIG. 2). Voltage sensor 642 is an example of voltage sensor 242 (FIG. 2).

Unlike the example embodiment of FIG. 2, the example embodiment of FIG. 6 includes a reference $i_d$ controller 662 that includes a reference $i_d$ signal ($i_{dc\_ref}$) input on a reference $i_{dc}$ input 656 and a sensed or calculated current, $i_{dc}$, input. Reference $i_{dc}$ input 656 is a minimum current expected from the power supply as determined during experimental operation of the motor 604. An input $i_{dc}$ signal ($i_{dc}$) is a supply current value that is estimated using, for example, phase currents $i_a$, $i_b$, and/or $i_c$, or that is sensed from current sensor 652. Combiner 650 combines $i_{dc\_ref}$ (input 656) with the negative of $i_{dc}$ (input 658). The current sensor 652 continuously monitors the current from power source 602 to motor 604. If a negative current is detected by current sensor 652 (i.e., current is being provided from motor 604 to power source 602), combiner 650 provides a higher reference $i_d$ output signal ($i_{dref}$) or combined $i_{dref}$ signal to third combiner 634 through proportional integrator 654. Third combiner 634 combines $i_{dref}$ with $i_d$ to provide an output that approximately offsets the energy from the motor 604 being provided to the power source 602. Thus, combiner 650 is not a simple combiner, but only acts as a combiner when $i_{dc}$ is negative. If $i_{dc}$ is positive, combiner 650 simply passes $i_{dc\_ref}$. In this manner, $i_{dref}$ is modulated to increase $v_d$ when needed to mitigate current flow from motor 604 to power source 602.

Figure 7:
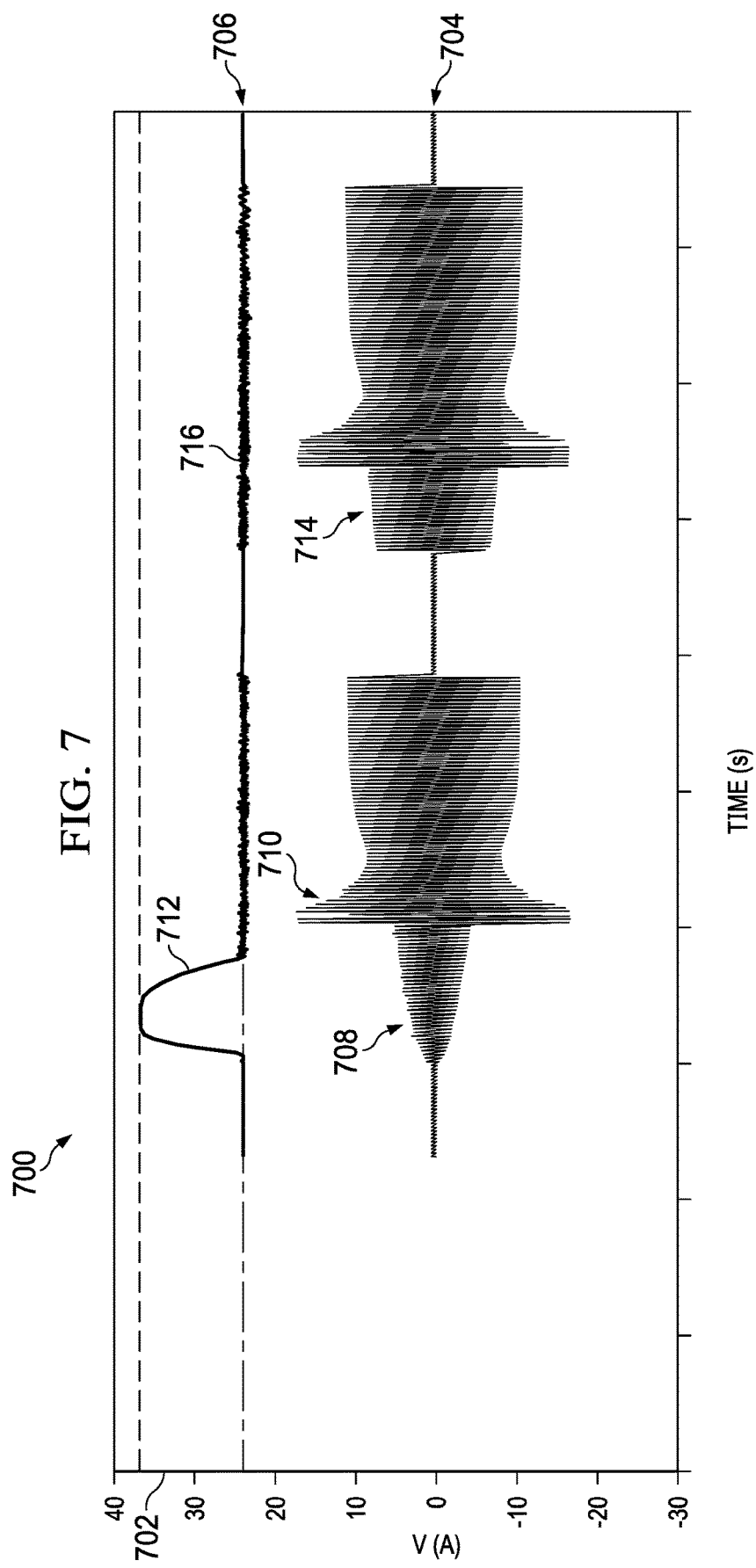
FIG. 7 is a graph illustrating voltage versus time for an FOC system of an example.

FIG. 7 is a graph 700 illustrating an example FOC system without and with an increased $i_d$. Graph 700 has a vertical axis 702 showing measurements in volts. Line 704 shows the composite voltage (i.e. all of the coil voltages superimposed on each other) on the stator coils of a first fan (not shown). Line 706 shows the voltage across the voltage supply to the first fan. A second fan (not shown) is placed near the first fan and used to cause the first fan to spin at a known speed prior to time 708. During time 708, $i_d$ is not increased in response to a negative power supply current. During time 714, $i_d$ is increased in response to a negative power supply current as explained above with regard to FIG. 6. At time 708, the motor of the first fan is started with a signal $i_q$ to cause the first fan to spin in the opposite direction of the initial, known speed caused by the second fan. At time 710, the first fan reverses and begins to spin in the opposite direction. Voltage spike 712 shows an increase in voltage when the fan is in the process of reversing. At time 708, $i_d$ is held at a constant low value. Voltage spike 712 illustrates an increase in voltage from the nominal 24 volts of the power supply to 40 volts. This 16 volt increase can easily damage some power supplies.

At time 714, the first fan is again spun to the known speed by the second fan. At time 714, the same $i_q$ applied at time 708 is applied. However, $i_d$ is increased to offset the kinetic energy of the fan. Point 716 on line 706 shows that there is no significant increase in the voltage at the power supply.

Figure 8:
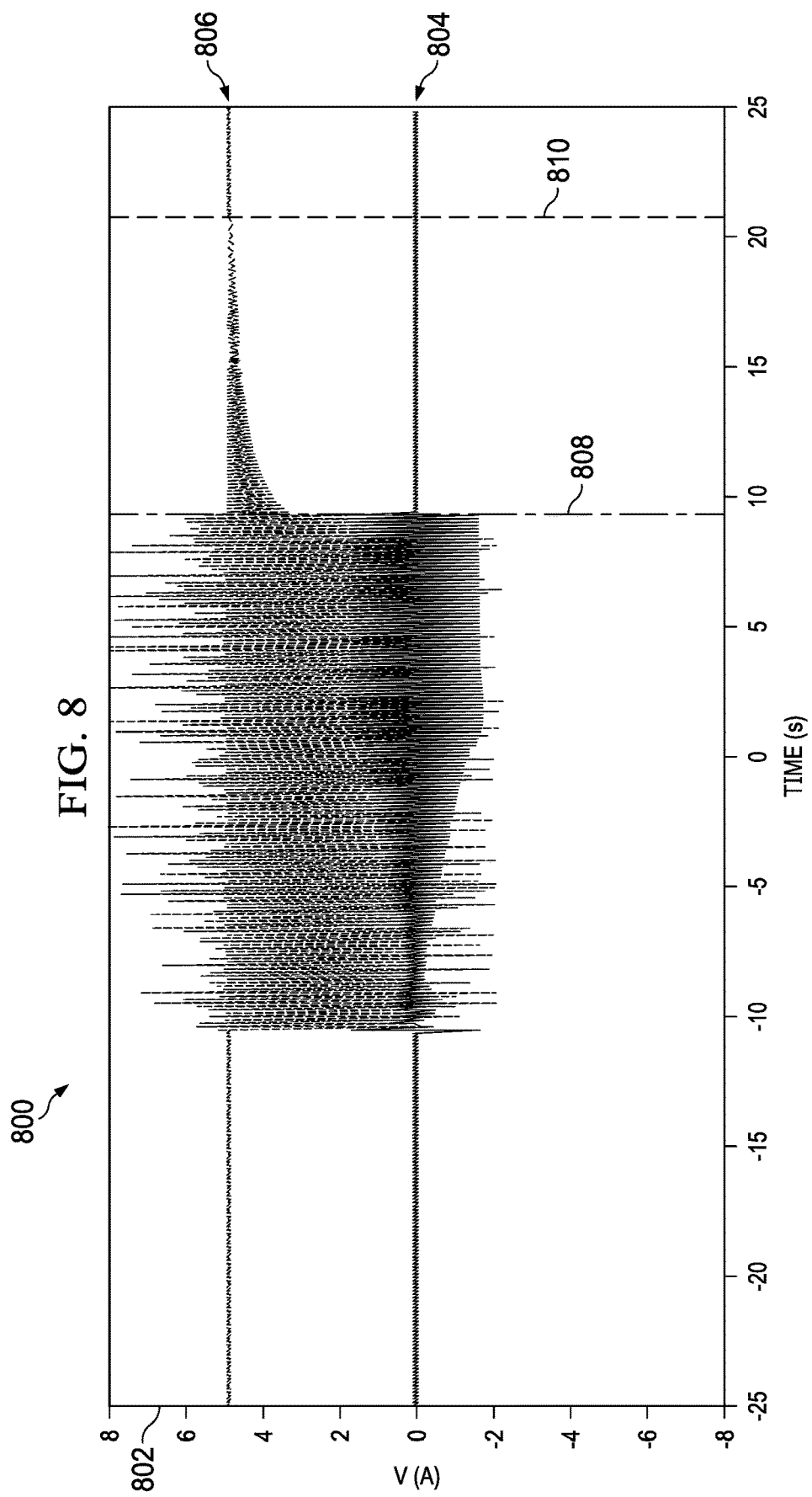
FIG. 8 is a graph of showing the current and voltage applied to a motor in a non-braked stop of the motor.

FIG. 8 is a graph 800 showing the current and voltage applied to a motor in a non-braked stop of the motor. That is, no energy is applied to the motor and it is allowed to spin to a stop. This figure is provided as a comparison to the passive braking of FIG. 9 and active braking of FIG. 10. Axis 802 shows the simultaneous current drawn by all of the motor coils. Line 804 is a composite of the current through the stator coils (i.e. the current through all of the coils superimposed on each other) and line 806 is the voltage at the power supply. A non-zero voltage indicates that the motor is still spinning. At time 808, $i_q$ is set to zero and the motor spins down to zero revolutions at time 810. This time is approximately 11.4 seconds with this experimental motor arrangement.

Figure 9:
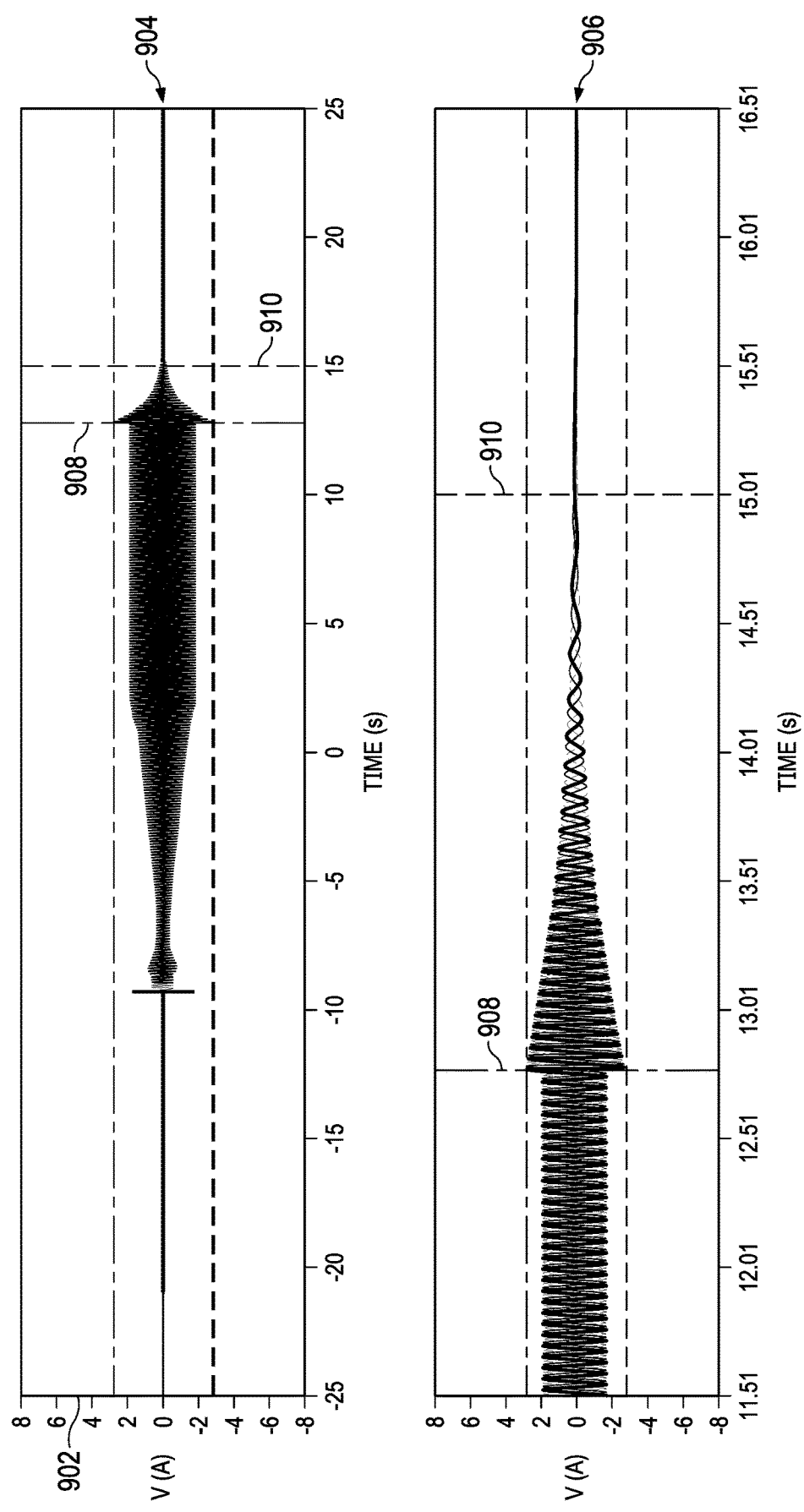
FIG. 9 is a graph showing the slowing of the example motor arrangement of FIG. 8 using active braking by shorting the stator coils.

FIG. 9 is a graph 900 showing the slowing of a motor using passive braking by shorting the stator coils and applying signals as discussed with reference to FIG. 8. In this example, a special mode is included in the power modulator (such as three-phase bridge 612 (FIG. 6)) to short the stator coils of the motor (such as motor 604 (FIG. 6)) to provide braking to the motor. Axis 902 shows the current in amperes. Line 904 is the composite current of the stators in the motor. At time 908, the stators of the motors are shorted. At time 910, the motor is stopped. Line 906 is an expanded view of the time between time 908 and time 910. Graph 900 shows that the time for the motor to stop is reduced to approximately 2.24 seconds as compared to the 11.4 seconds in the system as discussed with reference to FIG. 8. Graph 900 also shows that the peak-to-peak brake current is approximately 5.68 amps. As shown in graph 900, this peak-to-peak brake current is greater than the normal operating current of the motor, which can cause additional stress on the motor and on the driving MOSFETs.

FIG. 10 is a graph 1000 showing the slowing of the motor using active braking by applying a negative $i_q$ along with an offsetting $i_d$ rather than passive braking as in FIG. 8 or active braking as in FIG. 9. As with graph 900 (FIG. 9), axis 1002 shows amperage. Line 1004 shows the composite amperage through the stator coils. At time 1008, braking is applied using a negative $i_q$ with an offsetting $i_d$ according to the principals explained hereinabove with regard to FIG. 6. Line 1006 is an expanded view of the time between time 1008 and time 1010. The time to stop the motor is approximately 2.95 seconds, which is similar to the stopping time of shown in FIG. 9. However, the maximum peak-to-peak brake current is only about 2.5 amperes, which is well within the normal operating range of the motor. Thus, using a stopping force applied by a negative $i_q$ along with an offsetting $i_d$ provides approximately the same stopping power as shorting the stator coils while applying significantly less stress to the stator coils and avoiding the additional circuitry required to short the coils as used with active braking as in FIG. 9.

Figure 11:
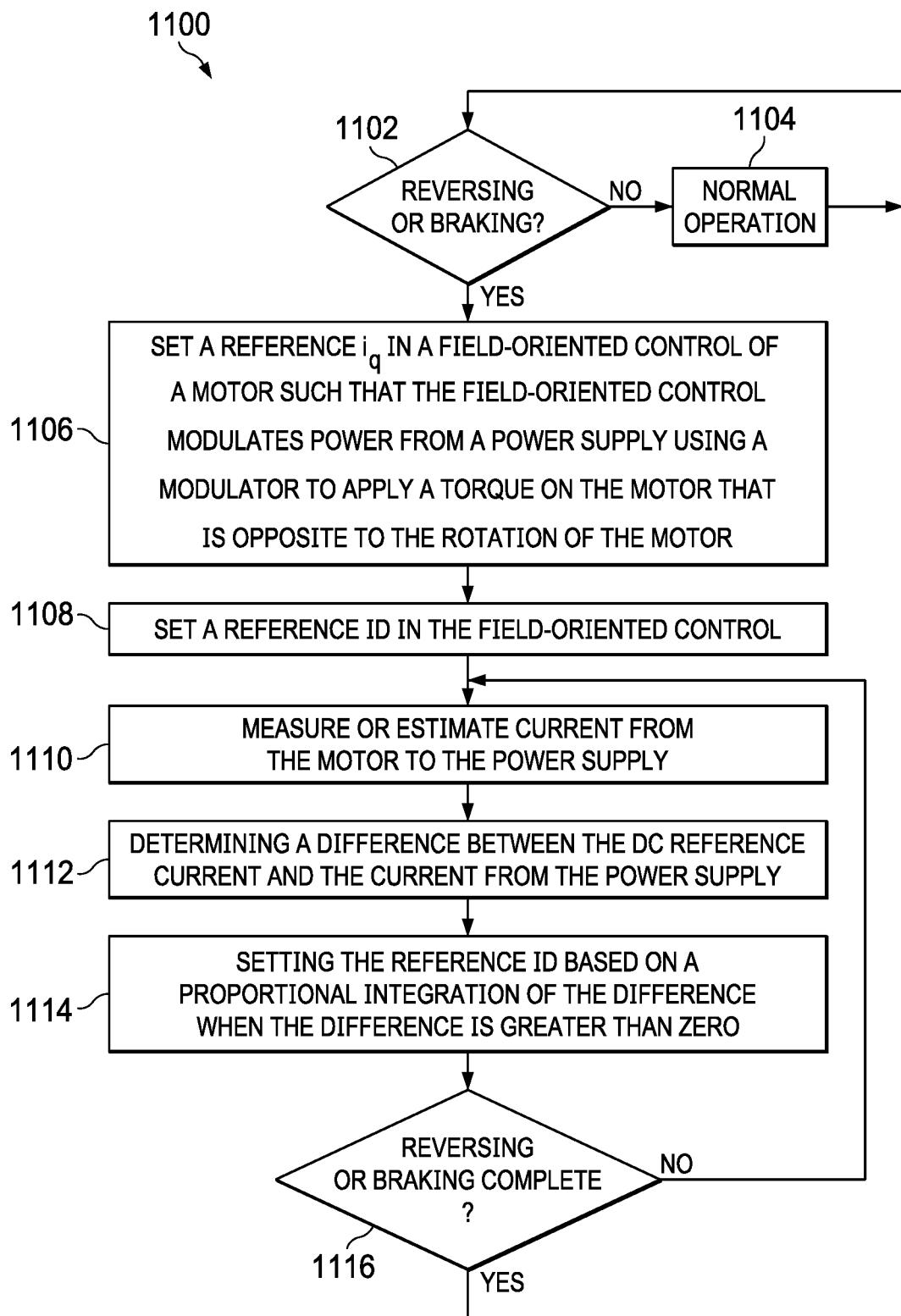
FIG. 11 is a process flow diagram on an example process.

FIG. 11 is a process flow diagram of an example process 1100. In step 1102, it is determined if current control commands involve reversing or braking of the motor. If no, step 1104 is normal operation of the motor. If yes, process 1100 goes to step 1106 which sets a reference $i_q$ signal (by, e.g. proportional integrator 628) in a field-oriented control of a motor such that the field-oriented control modulates power from a power supply using a modulator to apply a torque on the motor that is opposite to a rotation of the motor. In this example, the field-oriented control is an example of field-oriented controller 660 (FIG. 6). In this example, an example of three-phase bridge 612 (FIG. 6) modulates the power. In this example, the power supply is an example of power source 602 FIG. 6. In this example, the motor is an example of motor 604 (FIG. 6). Step 1108 is providing or setting a reference $i_d$. Step 1110 is measuring or estimating the current from the motor to the power supply. In an example, this is done by current sensor 652 (FIG. 6). Step 1112 is determining a difference between a dc reference current and the current from the power supply. Combiner 650 (FIG. 6) is an example of a device for determining this difference. Step 1114 is setting a reference $i_d$ signal in the field-oriented control so as to minimize any back current supplied by the motor to the power supply. Proportional integrator 654 is an example of a device for determining the proportional integration. Step 1116 is determining if the reversing or braking is complete. If the answer is no, the process loops back to step 1110. If the answer is yes, the process loops back to step 1102.

Figure 12:
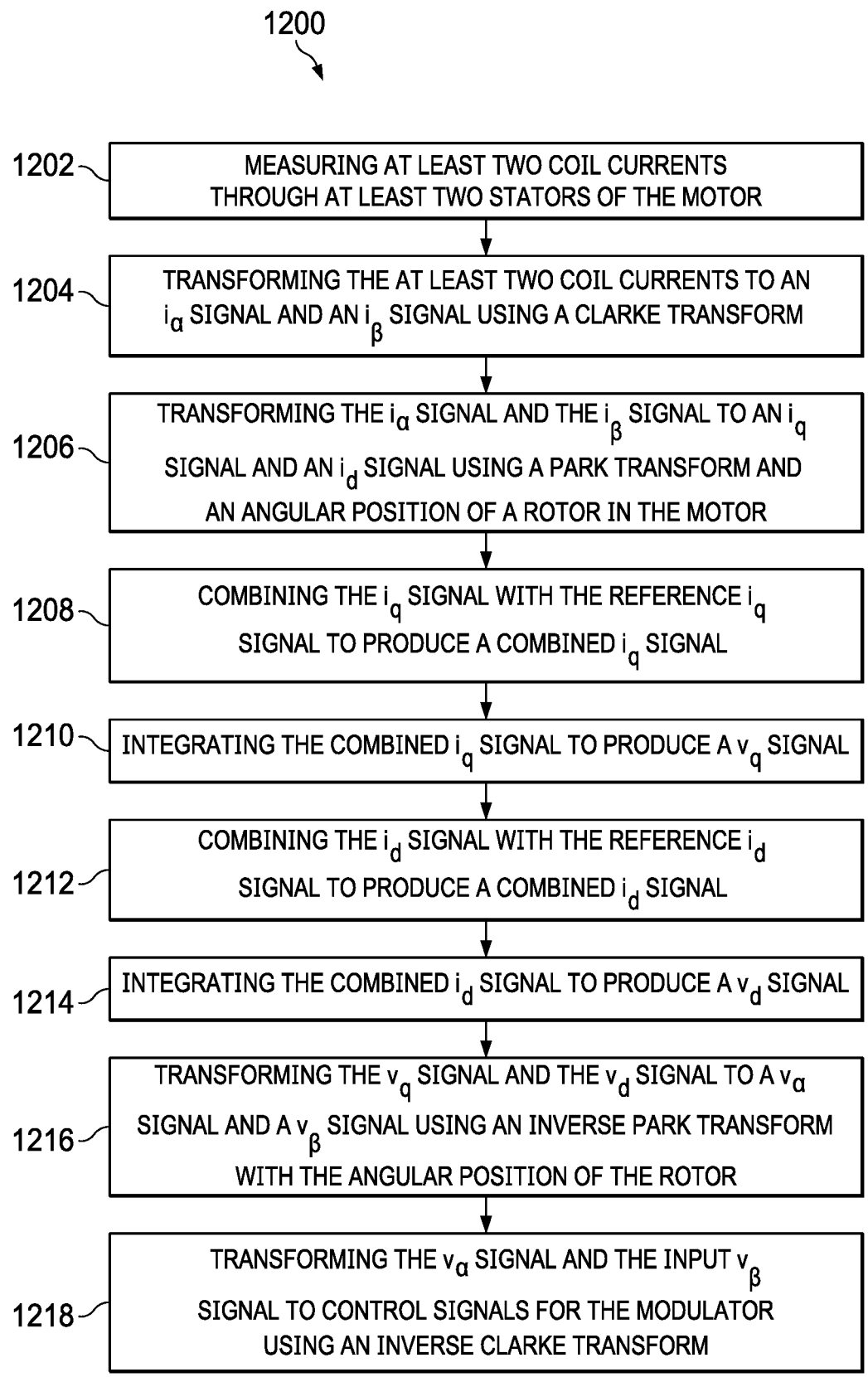
FIG. 12 is a process flow diagram of the operation of an example field-oriented control.

FIG. 12 is a process flow diagram of the operation of an example field-oriented control. Field-oriented control process 1200 is an example of the field-oriented control used in step 1106 (FIG. 11) and is an example of a process of operation of field-oriented controller 660 (FIG. 6). Step 1202 involves measuring at least two coil currents through at least two stator coils of the motor. An example of the motor is motor 604 (FIG. 6) and the coil currents may include $i_a$, $i_b$, and $i_c$. The at least two coil currents are transformed, in step 1204, to an $i_\alpha$ signal and an $i_\beta$ signal using a Clarke transform (e.g. by circuit 620). Signals $i_\alpha$ and $i_\beta$ are transformed, in step 1206, to an $i_q$ signal and an $i_d$ signal using a Park transform and an angular position of a rotor in the motor. In an example, an example of Park transform circuitry 624 (FIG. 6) performs this transforming step. Step 1208 is combining the $i_q$ signal with the reference $i_q$ signal to produce a combined $i_q$ signal. In an example, an example combiner such as second combiner 630 (FIG. 6) performs this combination. Step 1210 is integrating the combined $i_q$ signal to produce a $v_q$ signal. In an example, second proportional integrator 632 (FIG. 6) performs this integration and proportional adjustment. Step 1212 is combining the $i_d$ signal with the reference $i_d$ signal to produce a combined $i_d$ signal. In an example, third combiner 634 performs this combination. Step 1214 is integrating the combined $i_d$ signal to produce an input $v_d$ signal. In an example, third proportional integrator 636 (FIG. 6) performs this step. Step 1216 is transforming the $v_q$ signal and the $v_d$ signal to a $v_\alpha$ signal and a $v_\beta$ signal using an inverse Park transform with the angular position of the rotor. In an example, inverse Park transform 638 performs this step. Step 1218 is transforming the $v_\alpha$ signal and the $v_\beta$ signal to control signals for the modulator using an inverse Clarke transform. In an example, inverse Clarke transform circuit 640 performs this step.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device, or other electronics or a semiconductor component.

In this description, the term, a "combiner" is a device that combines two or more signals into one combined signal. The "combiner" as described herein may combine two or more signals into a single output or the "combiner" may simply pass one of the input signals to the output without combining it with the other input signals.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)), drain-extended MOSFETs (p-type or n-type) or other types of junction transistor and/or field effect transistors.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Unless otherwise stated, "about," "approximately," or "substantially" preceding a value means +/−10 percent of the stated value. Modifications are possible in the described examples, and other examples are possible within the scope of the claims.

What is claimed is:

1. A motor control comprising:
   a field-oriented control having a reference $i_q$ input, a reference is input and coil current feedback inputs configured to receive current signals from at least two current sensors detecting current through at least two coils in a motor, the field-oriented control configured to provide control signals to a modulator that modulates power from a power supply applied to the at least two coils;
   a reference $i_d$ controller having a reference $i_{dc}$ input configured to receive a reference $i_{dc}$ signal, an $i_{dc}$ input configured to receive a supply current measure, and a reference $i_d$ output coupled to the reference is input configured to provide a reference $i_d$ signal, wherein the reference $i_d$ controller is configured to increase the reference $i_d$ signal in proportion to a difference between the reference $i_{dc}$ input and the supply current measure when the $i_{dc}$ input indicates that power is flowing from the motor to the power supply; and
   wherein the reference is controller includes:
      a combiner configured to pass the reference $i_{dc}$ signal as a combined $i_{dref}$ signal when the supply measure current indicates that power is not flowing from the motor to the power supply, and configured to provide the difference between the reference $i_{dc}$ signal and the supply measure current as the combined $i_{dref}$ signal when the supply current measure indicates that power is flowing from the motor to the power supply; and a proportional integrator configured to receive the combined $i_{dref}$ signal, integrate and proportionally adjust the combined $i_{dref}$ signal and provide an output $i_d$ signal.

2. The motor control of claim 1, wherein the field-oriented control is configured to control three stator coils of the motor.

3. The motor control of claim 1, wherein the modulator is a three-phase bridge.

4. The motor control of claim 1, wherein the at least two current sensors is three current sensors, and the three current sensors detecting current through three coils in the motor.

5. A motor control comprising:
a field-oriented control having a reference $i_q$ input, a reference is input and coil current feedback inputs configured to receive current signals from at least two current sensors detecting current through at least two coils in a motor, the field-oriented control configured to provide control signals to a modulator that modulates power from a power supply applied to the at least two coils;
a reference $i_d$ controller having a reference $i_{dc}$ input configured to receive a reference $i_{dc}$ signal, an $i_{dc}$ input configured to receive a supply current measure, and a reference $i_d$ output coupled to the reference is input configured to provide a reference $i_d$ signal, wherein the reference $i_d$ controller is configured to increase the reference $i_d$ signal in proportion to a difference between the reference $i_{dc}$ input and the supply current measure when the $i_{dc}$ input indicates that power is flowing from the motor to the power supply; and
wherein the field-oriented control includes:
a Clarke transform configured to receive the current signals from the at least two current sensors and provide an output $i_\alpha$ signal and an output $i_\beta$ signal;
a Park transform configured to receive the output $i_\alpha$ signal and the output $i_\beta$ signal, and configured to receive an angular position signal, the Park transform configured to provide an output $i_q$ signal and an output $i_d$ signal;
a first combiner having a first input configured to receive the reference $i_d$ signal and a second input configured to receive the output $i_d$ signal, the first combiner providing a combined $i_d$ signal that is a difference between the reference $i_d$ signal and the output $i_d$ signal;
a first proportional integrator configured to receive the combined $i_d$ signal and provide an input $i_d$ signal that is a proportional integration of the combined $i_d$ signal;
a second combiner having a first input configured to receive a reference $i_q$ signal and a second input configured to receive the output $i_q$ signal, the second combiner providing a combined $i_q$ signal that is a difference between the reference $i_q$ signal and the output $i_q$ signal;
a second proportional integrator configured to receive the combined $i_q$ signal and provide an input $i_q$ signal that is a proportional integration of the combined $i_q$ signal;
an inverse Park transform configured to receive the input $i_q$ signal, the input $i_d$ signal and the angular position signal and output an input $i_\alpha$ signal and an input $i_\beta$ signal; and
an inverse Clarke transform configured to receive the input $i_\alpha$ signal and the input $i_\beta$ signal and configured to provide modulation signals to the modulator.

6. The motor control of claim 5, wherein the inverse Clarke transform is further configured to receive a measured voltage supply signal indicating a measured voltage across the power supply.

7. A motor control system adapted to be coupled to a power supply and a motor having a stator with at least two coils, the motor control system comprising:
a modulator coupled to the power supply, wherein the modulator controls application of power from the power supply to the at least two coils;
a field-oriented control having a reference $i_q$ input, a reference is input and coil current feedback inputs configured to receive current signals from at least two current sensors detecting current through the at least two coils, the field-oriented control configured to provide control signals to the modulator;
a reference $i_d$ controller having a reference $i_{dc}$ input configured to receive a reference $i_{dc}$ signal, an $i_{dc}$ input configured to receive measured supply current provided by a current sensor on the power supply, and a reference $i_d$ output coupled to the reference $i_d$ input configured to provide a reference $i_d$ signal, wherein the reference is controller is configured to increase the reference $i_d$ signal in proportion to a difference between the reference $i_{dc}$ input and the measured supply current when the $i_{dc}$ input indicates that power is flowing from the motor to the power supply; and
wherein the reference is controller includes:
a combiner configured to pass the reference $i_{dc}$ signal as a combined $i_{dref}$ signal when the measured supply current indicates that power is not flowing from the motor to the power supply, and configured to provide the difference between the reference $i_{dc}$ signal and the measured supply current as the combined $i_{dref}$ signal when the $i_{dc}$ input indicates that power is flowing from the motor to the power supply; and
a proportional integrator configured to receive the combined $i_{dref}$ signal, integrate and proportionally adjust the combined $i_{dref}$ signal and provide an output $i_d$ signal.

8. The motor control system of claim 7, wherein the motor has three stator coils.

9. The motor control system of claim 7, wherein the modulator is a three-phase bridge.

10. The motor control system of claim 7, wherein the at least two current sensors is three current sensors, and the three current sensors detecting current through three coils in the motor.

11. The motor control system of claim 7, wherein the field-oriented control includes:
a Clarke transform configured to receive the current signals from the at least two current sensors detecting current through the at least two stator coils and provide an output $i_\alpha$ signal and an output $i_\beta$ signal;
a Park transform configured to receive the output $i_\alpha$ signal and the output $i_\beta$ signal, and configured to receive an angular position signal, the Park transform configured to provide an output $i_q$ signal and an output $i_d$ signal;
a first combiner having a first input configured to receive the reference $i_d$ signal and a second input configured to receive the output $i_d$ signal, the first combiner providing a combined is signal that is a difference between the reference $i_d$ signal and the output $i_d$ signal;
a first proportional integrator configured to receive the combined $i_d$ signal and provide an input $i_d$ signal that is a proportional integration of the combined $i_d$ signal;

a second combiner having a first input configured to receive a reference $i_q$ signal and a second input configured to receive the output $i_q$ signal, the second combiner providing a combined $i_q$ signal that is a difference between the reference $i_q$ signal and the output $i_q$ signal;

a second proportional integrator configured to receive the combined $i_q$ signal and provide an input $i_q$ signal that is a proportional integration of the combined $i_q$ signal;

an inverse Park transform configured to receive the input $i_q$ signal, the input $i_d$ signal and the angular position signal and output an input $i_\alpha$ signal and an input $i_\beta$ signal; and an inverse Clarke transform configured to receive the input $i_\alpha$ signal and the input $i_\beta$ signal and configured to provide modulation signals to the modulator.

12. The motor control system of claim 11, wherein the inverse Clarke transform is further configured to receive a measured voltage supply signal indicating a measured voltage across the power supply.

13. A method comprising:
setting a reference $i_q$ signal in a field-oriented control of a motor such that the field-oriented control modulates power from a power supply using a modulator to apply a torque on the motor that is opposite to a kinetic energy applied to the motor;

setting a reference $i_d$ signal in the field-oriented control such that the motor current provided to the power supply is reduced; and wherein the field-oriented control performs the steps of:
measuring at least two coil currents through at least two stators of the motor;
transforming the at least two coil currents to an is signal and an $i_\beta$ signal using a Clarke transform;
transforming the $i_\alpha$ signal and the $i_\beta$ signal to an $i_q$ signal and an $i_d$ signal using a Park transform and an angular position of a rotor in the motor;
combining the $i_q$ signal with the reference $i_q$ signal to produce a combined $i_q$ signal;
integrating the combined $i_q$ signal to produce a $v_q$ signal;
combining the $i_d$ signal with the reference $i_d$ signal to produce a combined $i_d$ signal;
integrating the combined $i_d$ signal to produce a $v_d$ signal;
transforming the $v_q$ signal and the $v_d$ signal to a $v_\alpha$ signal and a $v_\beta$ signal using an inverse Park transform with the angular position of the rotor; and
transforming the $v_\alpha$ signal and the $v_\beta$ signal to control signals for the modulator using an inverse Clarke transform.

14. The method of claim 13, wherein the setting of $i_d$ includes:
setting a dc reference current;
determining a supply current measure;
determining a difference between the dc reference current and the supply current measure; and
setting the reference $i_d$ signal based on a proportional integration of the difference when the difference is greater than zero.

15. The method of claim 13, wherein the inverse Clarke transform receives a measured voltage supply signal indicating a measured voltage across the power supply.

16. The method of claim 13, wherein the reference $i_q$ signal is determined using a difference between reference rotational speed of the motor and an estimated speed of the motor.

17. The method of claim 13, wherein the angular position of the rotor is determined using a speed and position estimator.

* * * * *